US007058591B2

(12) United States Patent
Giuliani et al.

(10) Patent No.: US 7,058,591 B2
(45) Date of Patent: Jun. 6, 2006

(54) METHOD AND APPARATUS FOR GENERATING PURCHASE INCENTIVES BASED ON PRICE DIFFERENTIALS

(75) Inventors: John A. Giuliani, Lake Forest, IL (US); Scott R. VanDeVelde, Chicago, IL (US); Waleed M. Al-Atraqchi, Tonka Bay, MN (US)

(73) Assignee: Catalina Marketing International, Inc., St. Petersburg, FL (US)

( * ) Notice: Subject to any disclaimer, the term of this patent is extended or adjusted under 35 U.S.C. 154(b) by 1282 days.

(21) Appl. No.: 09/286,304

(22) Filed: Apr. 6, 1999

(65) Prior Publication Data

US 2001/0051895 A1    Dec. 13, 2001

Related U.S. Application Data

(63) Continuation of application No. 08/924,029, filed on Aug. 29, 1997, now Pat. No. 5,974,399.

(51) Int. Cl.
  *G07G 1/14*   (2006.01)
(52) U.S. Cl. .......................................... 705/14; 705/35
(58) Field of Classification Search ................ 705/10, 705/14, 20, 26; 707/10, 100, 104, 200
  See application file for complete search history.

(56) References Cited

U.S. PATENT DOCUMENTS

| 5,056,019 | A | 10/1991 | Schultz et al. ................ 705/14 |
| 5,173,851 | A | 12/1992 | Off et al. ....................... 705/14 |
| 5,612,868 | A | 3/1997 | Off et al. ....................... 705/14 |
| 5,621,812 | A | 4/1997 | Deaton et al. ................. 705/14 |
| 5,644,723 | A | 7/1997 | Deaton et al. ................. 705/14 |
| 5,649,114 | A | 7/1997 | Deaton et al. ................. 705/14 |
| 5,687,322 | A | 11/1997 | Deaton et al. ................. 705/14 |
| 5,761,648 | A | 6/1998 | Golden et al. ................. 705/14 |
| 5,822,735 | A | 10/1998 | De Lapa et al. .............. 705/14 |

*Primary Examiner*—Frantzy Poinuil
(74) *Attorney, Agent, or Firm*—Neifeld IP Law, PC

(57) ABSTRACT

A technique for customizing purchase incentives, such as discount coupons and the like, based on whether a consumer buys a promoted item or a competitive item, and on the price of the promoted item relative to the competitive item. The invention identifies promoted or competitive products in a consumer's order, and selects an incentive that is appropriate for the price differential between the promoted and competitive items, and for the purchase choice already made between the promoted and competitive items. a different incentive is provided for the different pricing and choice combinations, in an effort to maximize sales for the promoted item, and the different incentives are stored in an incentive matrix accessed by product purchased and by consumer profile as determined from whether the consumer bought the more expensive item, the less expensive item, or one of two equally priced items.

12 Claims, 6 Drawing Sheets

| CONSUMER PROFILE CATEGORY | BRAND A (PROMOTED BRAND) PURCHASED | BRAND B (COMPETING BRAND) PURCHASED |
|---|---|---|
| CONSIDERED SET | BRAND A $1.79<br>BRAND B $2.29<br><br>INFERRED CONSUMER PROFILE:<br>BRAND A CONSIDERED SET<br><br>STRATEGY:<br>INCREASE FAIR SHARE | BRAND A $2.29<br>BRAND B $1.79<br><br>INFERRED CONSUMER PROFILE:<br>BRAND B CONSIDERED SET<br><br>STRATEGY:<br>INCREASE FAIR SHARE |
| PREFERENCE | BRAND A $2.29<br>BRAND B $2.29<br><br>INFERRED CONSUMER PROFILE:<br>BRAND A PREFERENCE<br><br>STRATEGY:<br>EXPAND CONSUMPTION | BRAND A $2.29<br>BRAND B $2.29<br><br>INFERRED CONSUMER PROFILE:<br>BRAND B PREFERENCE<br><br>STRATEGY:<br>INDUCE TRIAL |
| LOYAL | BRAND A $2.29<br>BRAND B $1.79<br><br>INFERRED CONSUMER PROFILE:<br>BRAND A LOYAL<br><br>STRATEGY:<br>INSULATE POSITION | BRAND A $1.79<br>BRAND B $2.29<br><br>INFERRED CONSUMER PROFILE:<br>BRAND B LOYAL<br><br>STRATEGY:<br>INDUCE TRIAL/CONVN. |

FIG. 6

METHOD AND APPARATUS FOR GENERATING PURCHASE INCENTIVES BASED ON PRICE DIFFERENTIALS

This application is a continuation of application Ser. No. 8/924,029 filed on Aug. 29, 1997 now U.S. Pat. No. 5,974,399.

BACKGROUND OF THE INVENTION

This invention relates generally to point-of-sale computer systems of the type used in retail stores to record sales transactions. More particularly, the invention relates to point-of-sale systems capable of generating discount coupons and similar purchase incentives. Discount coupons have long been used in the packaged goods industry to promote the sale of specific items to consumers. Many discount coupons are distributed by mail, or as inserts (known as free standing inserts) in newspapers and magazines. This method of distribution has the major drawback that it is not "targeted" to consumers most likely to use the discount coupons. Consequently, mass distribution of discount coupons results in a very low rate of redemption of the coupons. Most consumers simply ignore them or, if they use coupons at all, discard them because of lack of interest in the specifically promoted products.

A revolutionary change in techniques of discount coupon distribution began with the system described in U.S. Pat. No. 4,723,212 issued to Thomas L. Mindrum et al., entitled "Method and Apparatus for Dispensing Discount Coupons." In this system, coupons were generated and distributed in the retail store, based on the products purchased by the consumers. If a consumer purchased a "triggering" product that had been previously selected as part of a promotion, the consumer would receive a discount coupon upon paying for purchased items at a checkout stand. The coupon handed to the consumer typically provides for a discount on a competitive or complementary product when the customer returned to the store on a subsequent visit. Thus, in the system described in the Mindrum et al. patent, discount coupons generated in the store were distributed only to consumers who had been "targeted" because of their purchase of competitive or related products. U.S. Pat. No. 4,910,672 issued to George W. Off et al., having the same title, disclosed additional features of the system described in the Mindrum et al. patent.

Although the system described in the Mindrum et al. and Off et al. patents constituted a significant improvement in techniques for the generation and distribution of discount coupons, there were nevertheless a number of aspects of coupon distribution that these two prior patents did not address. Basically, the prior system uses only one condition for generation of a coupon: whether the consumer had presented a specific triggering item or items for purchase. The redemption rate for coupons distributed with use of the Mindrum et al. system has been much higher than redemption rates for conventionally distributed coupons. Many coupons still go unredeemed, however, for a variety of reasons. The consumer may be loyal to the brand of product that triggered the coupon; or the triggering product brand may be much lower in price than the discounted one; or the consumer may prefer the triggering brand over the discounted brand for some other reason unrelated to price or loyalty. A desirable goal in such systems is to maximize the redemption rate by more precisely "targeting" the consumers that receive coupons. The present invention accomplishes this goal.

SUMMARY OF THE INVENTION

The present invention resides in a targeted incentive generation apparatus, for use with a sales transaction recording system having at least one checkout terminal and a store controller with access to an item price file. The apparatus of the invention comprises storage means for holding data defining separate sets of incentive terms pertaining to at least one item of which sales are to be promoted; means for identifying a purchased triggering item presented at a checkout terminal; means for identifying an additional item associated with the purchased triggering item in an incentive deal, wherein one of the two items is a promoted item and the other is a competitive item; means for obtaining sales prices for the promoted item and the competitive item; and means for selecting a set of incentive terms from the storage means, based on whether the purchased triggering item is the promoted item or the competitive item, and further based on the prices of the promoted item and the competitive item. Thus the incentive terms are tailored to a consumer's purchasing behavior and the price of the promoted item relative to the competitive item. Finally, the apparatus comprises means for generating an incentive for distribution to the consumer, consistent with the selected set of incentive terms.

In the disclosed embodiment of the invention, each set of incentive terms takes the form of an entry in a table of incentive terms accessed by a first parameter defining whether the purchased item is the promoted item or the competitive item, and a second parameter defining the relative price relationship between the promoted item and the competitive item. In the disclosed embodiment, the second parameter provides for access to different table entries based on whether the competitive item price is more, less, or the same as the promoted item price. More specifically, the second parameter defining the price relationship has at least three values, including a first value when the purchased item has the lower price, a second value when the purchased item and the competitive items have the same price, and a third value when the purchased item has the higher price.

In an alternative embodiment of the invention, the apparatus further comprises means for identifying at least one other additional item associated with the purchased triggering item. One of the triggering and additional items is a promoted item and the others are competitive items. In this embodiment, the means for obtaining sales prices obtains the prices of all the additional items, and the storage means contains additional sets of incentive terms, for use in selecting a set of incentive terms for each possible pairing of promoted and competitive items.

The invention may also be defined in terms of a method for generation of purchase incentives, for use with a sales transaction recording system having at least one checkout terminal and a store controller with access to an item price file. The method comprises the steps of storing in a storage means data defining multiple separate sets of incentive terms pertaining to at least one item of which sales are to be promoted; identifying a purchased triggering item presented at a checkout terminal; identifying an additional item associated with the purchased triggering item in an incentive deal, wherein one of the two items is a promoted item and the other is a competitive item; obtaining sales prices for the promoted item and the competitive item; and selecting a set of incentive terms from the storage means, based on whether the purchased triggering item is the promoted item or the competitive item, and further based on the prices of the promoted item and the competitive item. Thus, the incentive is tailored to a consumer's purchasing behavior and to the price of the promoted item relative to the competitive item. The method also includes the step of generating an incentive for the consumer, consistent with the selected set of incentive terms.

More specifically, the step of selecting a set of incentive terms includes retrieving a set of incentive terms from an incentive matrix accessed by first and second parameters, wherein the first parameter is whether or not the purchased item is the promoted item and the second parameter is the price of the promoted item relative to the price of the competitive item. The second parameter defining the price relationship has at least three values, including a first value when the purchased item has the lower price, a second value when the purchased item and the competitive items have the same price, and a third value when the purchased item has the higher price.

In a different embodiment of the invention, the method may also include identifying at least one other additional item associated with the purchased triggering item, one of the purchased and additional items being a promoted item and the others being competitive items. The step of obtaining sales prices includes obtaining sales prices of all of the additional items; and the step of selecting a set of incentive terms includes selecting multiple sets of incentive terms, each applicable to a different possible pairing of promoted and competitive items.

It will be appreciated from the foregoing that the present invention represents a significant advance in the field of automatic generation of purchasing incentives in a retail store environment. In particular, the invention provides for automatic adjustment of a purchasing incentive based on the price paid for an item purchased and on whether a promoted item or a competitive item is purchased. Other aspects and advantages of the invention will become apparent from the following more detailed description, taken in conjunction with the drawings.

BRIEF DESCRIPTION OF THE DRAWINGS

FIG. 6 is an illustrative incentive decision matrix used in the invention.

DESCRIPTION OF THE PROFFERED EMBODIMENT

Figure 1:
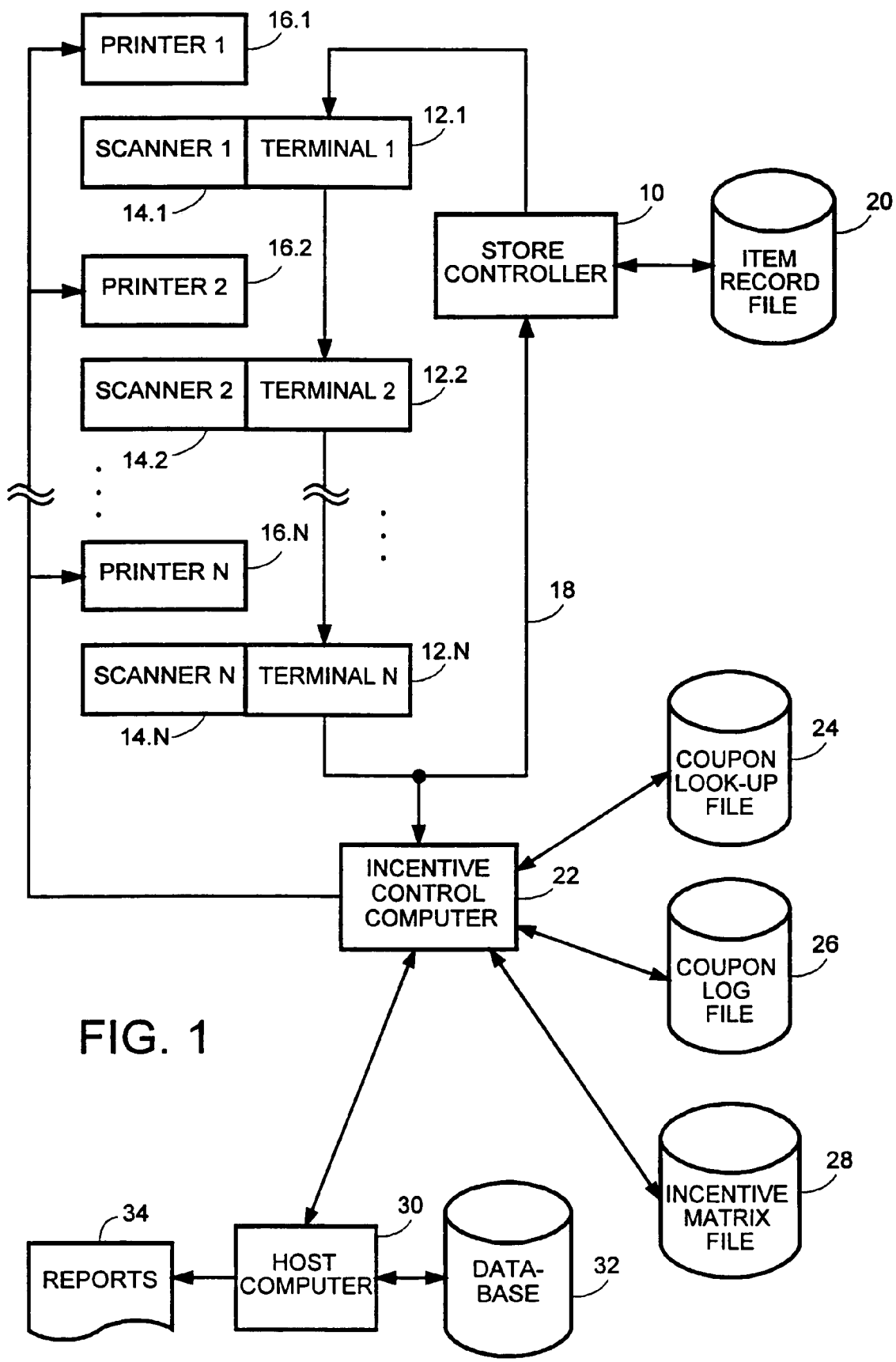
FIG. 1 is a block diagram of an in-store computer system in which the present invention is implemented.

As shown in the drawings for purposes of illustration, the present invention pertains to a novel technique for generation and distribution of purchase incentives, such as discount coupons, based on a variety of factors used to "target" consumers who will benefit most from the incentives, and who are, therefore, more likely to redeem distributed discount coupons on a subsequent store visit. Prior to the present invention, systems for in-store discount coupon generation selected consumers to receive coupons based solely on whether or not the consumers had purchased a "triggering" product associated with each coupon deal. For example, if a consumer purchased a product of one particular brand, he or she might receive a discount coupon for a competitive brand of the same product, good for a discount on a subsequent store visit. The principal drawback of this type of system is that it pays no attention to the relative prices of the competing products.

In accordance with the present invention, an in-store purchase incentive is modified prior to generation of the incentive, based principally on the relative pricing of the purchased and discounted products. The incentive, whether in the form of a discount coupon or something else, may be customized to any desired level of targeting precision, using a consumer profile inferred from the consumer's product selection and the price of the selection relative the price or prices of competing products. The incentive may also be referred to more generally as a "communication" to the consumer.

The system of the invention is implemented in a retail store or, more commonly, in multiple retail stores, as shown generally in FIG. 1. Each store in which the invention is implemented has a store controller, indicated by reference numeral 10, and a plurality of checkout terminals 12.1, 12.2, through 12.N, referred to for convenience by reference numeral 12. The terminals 12 have optical scanners 14.1, 14.2 through 14.N and printers 16.1, 16.2 through 16.N, referred to by numerals 14 and 16. The terminals 12 are typically connected to the store controller by a continuous data and control bus 18 referred to as the store loop. The store controller 10 has access to various databases, including an item record file 20, which contains a record of each item in the store's inventory. Each item record includes the item price, and other data specific to the item. As is now well known, when a customer presents products or items for purchase at a checkout stand, a sales clerk scans each item for a bar code printed on the item packaging. The bar code defines the product uniquely. In the retail grocery business in the United States of America, product bar codes are standardized as Uniform Product Codes. In other retail businesses, different standards may be used to identify items, and in other countries the product bar codes may follow different standards.

The store equipment also includes another computer, referred to in this specification as the incentive control computer 22. The incentive control computer is shown as being a separate processor connected to the store loop 18 to "eavesdrop" on sales transaction data and control signals transmitted from any of the terminals 12 to the store controller 10. It will, of course, be understood that the functions of the incentive control computer 22 could be integrated with those of the store controller 10. For convenience of design and maintenance, however, it is usually desirable to separate the traditional store controller functions from those relating to generation of incentives for consumers.

The incentive control computer 22 has access to a number of related databases, two of which are a coupon look-up file 24 and a coupon log file 26. In this specification, the words "coupon" and "incentive" are used interchangeably, but it will be understood that an incentive may take the form of the familiar discount coupon printed on paper, or may take some other form. An incentive may be provided to the consumer on some medium other than paper, such as a membership card having a recording medium, or the incentive may take an even less tangible form, such as a digital record transferred to the consumer's account at the store or at a banking institution. The "incentive" may be a discount applied to a subsequent purchase, a free trial offer for a specific product, or a cash discount on a subsequent store visit. As presently implemented, the incentive will be conveyed to the consumer as a piece of paper, which is referred to herein as a "coupon." Hence the terms "coupon look-up file," "coupon deal," "coupon log file," and so forth, but use of the word "coupon" is not intended to be limited to a paper discount coupon.

There are various ways to link operation of the incentive control computer 22 with the sales transaction process controlled by the store controller 10. In a presently preferred embodiment of the invention, and as disclosed in U.S. Pat. No. 4,723,212, each item record in the item record file 20 has "trigger" flag field, which identifies the item as being subject to an incentive deal defined in the coupon look-up file 24. The coupon look-up file 24 contains a coupon index record for each item having a trigger flag in its item record of the item record file 20. Thus, when a triggering item is encountered in the processing of a consumer's order, the incentive control computer 22 retrieves the coupon index record for the triggering item. The coupon index record contains one or more coupon look-up numbers, each of which provides a linkage to a coupon deal record also stored in the coupon look-up file. Each coupon deal record defines a specific coupon deal presently in effect for the triggering product. For the invention disclosed in U.S. Pat. No. 4,723,212, a coupon deal will simply define the terms of a discount coupon to be generated if various conditions are satisfied. For the present invention, the coupon deal record provides a linkage to an incentive matrix for the coupon deal involving this particular item. The incentive matrices are stored, for example, in an incentive matrix file 28 coupled to the incentive control computer 22. The structure and function of an incentive matrix is further explained below with reference to FIG. 6.

The incentive control computer 22 in each store may be linked to a remotely located host computer 30, which maintains a central database 32 and generates periodic reports 34 for management personnel. The host computer 30 downloads details of incentives to individual stores, and uploads performance data from the stores, including the numbers incentives generated and redeemed.

Figure 2:
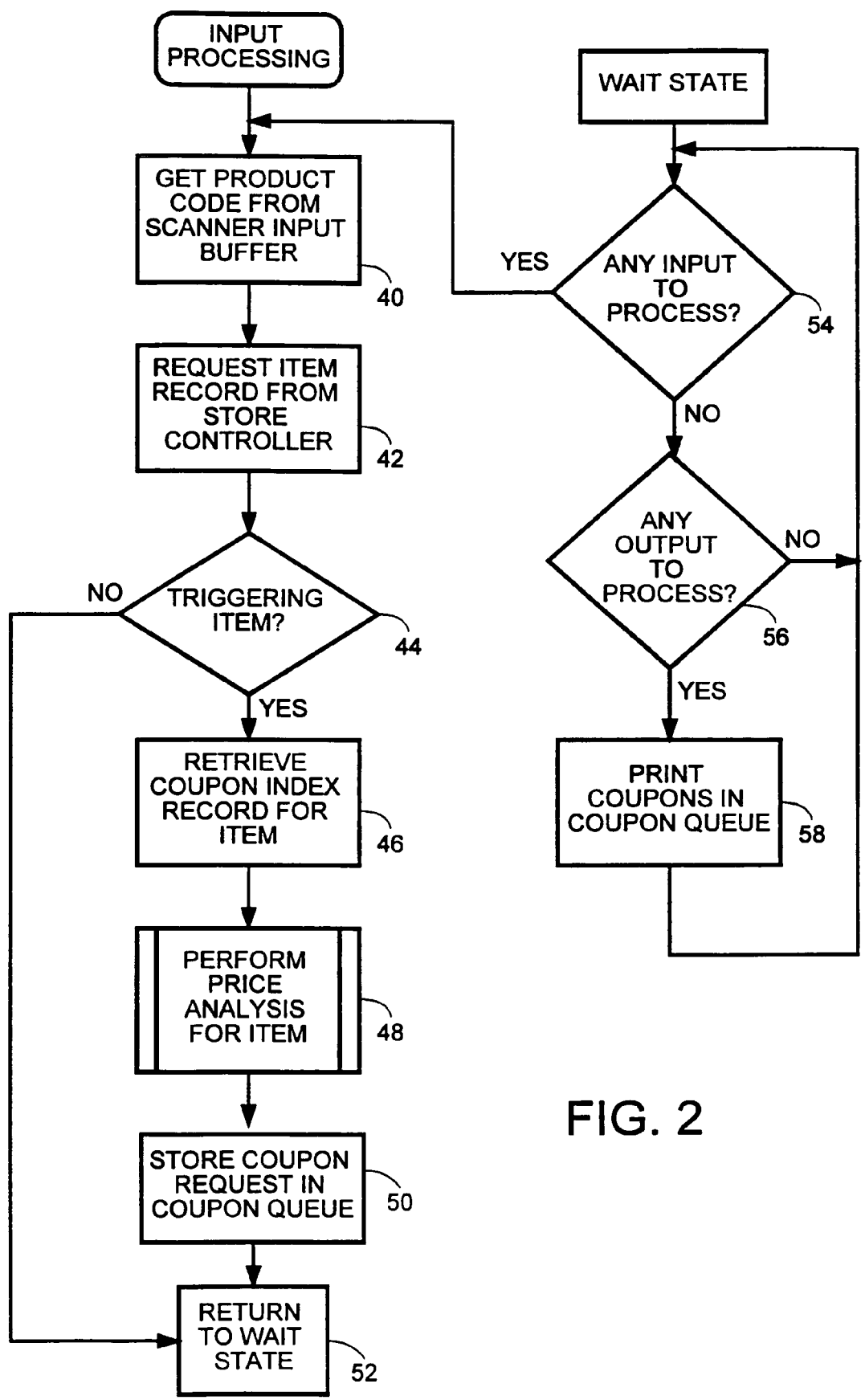
FIG. 2 is a flowchart showing some of the pertinent functions performed by an incentive control computer in FIG. 1.

FIG. 2 depicts the functions performed in the incentive control computer 22 in processing input data. It will be appreciated that the computer 22 also performs other, routine housekeeping functions, but how these are implemented is not critical to the present invention.

In input processing, the computer 22 first obtains a product code from a scanner 14 associated with one of the terminals 12, as indicated in block 40. Using the input product code, the computer 22 requests the corresponding item record from the store controller 10, as indicated in block 42. If the item record indicates that this is a triggering item, as determined in decision block 44, the computer 22 next retrieves the coupon index record for the item, as indicated in block 46. From the coupon index record and a related coupon deal record, the computer 22 can determine which type of incentive or coupon deal is to be triggered. If the incentive deal is of the type with which this invention is concerned, the computer 22 performs a price analysis for the scanned triggering item, as indicated in block 48, and as will be described in more detail below. If the incentive to be generated is a printed coupon, the computer 22 next stores a coupon request in a coupon queue, as indicated in block 50, and returns to a "wait state," as indicated by block 52. The wait state of the computer is a small processing loop through which the computer cycles when when determining which function to perform next, such as processing input data or output data. The right-hand side of FIG. 2 shows part of the wait state processing loop of the computer 22. Basically, in the wait state the computer 22 continually poses the questions: is there any input data to process, as shown in decision block 54, and is there any output data to process, as shown in decision block 56. If there is input data to process, the computer 22 goes to the input processing sequence, starting with block 40. If there is any output to process, the computer 22 prints any coupons in the coupon queue, as indicated in block 58 and continues to cycle through the wait state.

Figure 3:
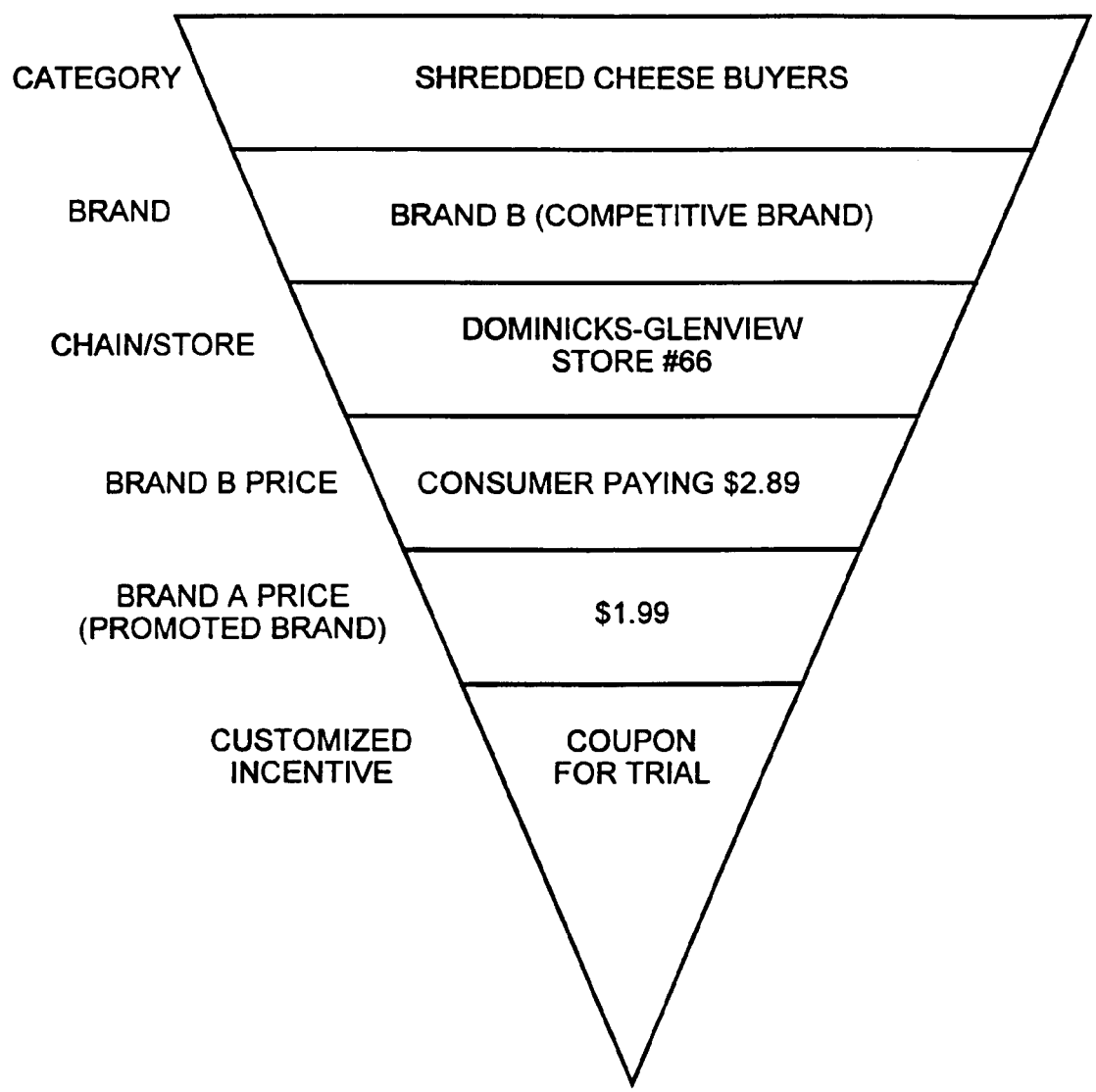
FIG. 3 is a diagram depicting the targeted nature of the incentive of the present invention.

FIG. 3 shows in diagrammatic form an example of a targeted incentive generated by the method and apparatus of the invention. As indicated in the widest band at the top of the figure, the incentive involves a shredded cheese product as the product category. The width of the band indicates the degree to which an incentive is not targeted. Thus, merely selecting consumers based on the purchase of the shredded cheese product provides a relatively untargeted incentive, not too much better than a mass mailing of discount coupons. Targeting the incentive to purchasers of particular brand of shredded cheese narrows the focus of the incentive slightly. Targeting may also be selective as to the chain and store in which the incentive is effective, as indicated by the third band from the top of the figure. This level of targeting has also been available using the system of the prior art. The lower and narrower bands in the figure depict the effect of the present invention, which takes into account the price the consumer is paying for the competitive product and the price of a promoted brand of the same product category. The figure shows by way of example a situation in which the customer has paid $2.89 for the competitive brand, while the promoted brand is available for $1.99. The apex of the triangle shown in FIG. 3 indicates a high degree of incentive targeting to this particular small group of customers who have paid significantly more for shredded cheese than the price of the promoted product. An appropriate coupon is generated to make the consumer aware of the promoted product, and the amount of the incentive is tailored to the price differential. In this example, with a relatively large price differential, the amount of incentive needed to induce the consumer to try the promoted product is probably not very high. Other situations may call for different incentive strategies, which further narrow the incentive targeting.

Figure 4:
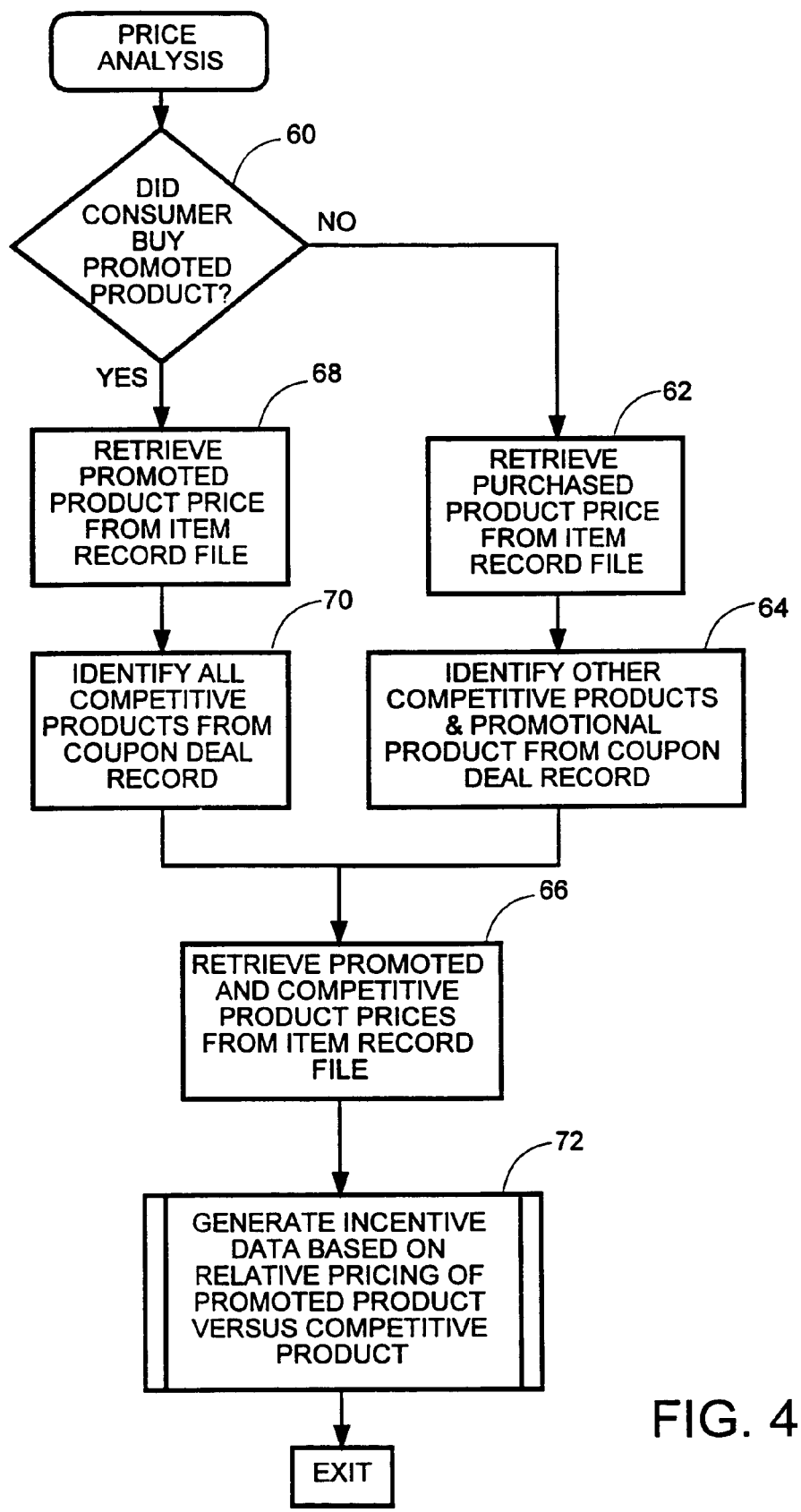
FIG. 4 is a flowchart showing a price analysis step of FIG. 2 in more detail.

FIG. 4 is a flowchart showing the functions performed in the price analysis block 48 (FIG. 2) in more detail. The first step in this analysis is to determine whether the consumer is purchasing the promoted product or a competitive product, as indicated in decision block 60. Even if the consumer purchases the promoted product, there may be good reason to generate a reward or promotion of some kind to bolster the consumer's loyalty to the product, especially if the promoted product is higher in price than competitive brands. The next three steps, regardless of which type of product has been purchased, function to retrieve the prices of the promoted and competitive products. The details of these steps depend principally on the file structure in the store.

If the consumer purchased a competitive product, the item record file for that product provides the price of the competitive product, as indicated in block 62, and also provides a linkage to the coupon look-up file 24, from which the computer 22 can retrieve the item codes of the promoted product and (optionally) of any other competitive products, as indicated in block 64. Using these item codes, the computer 22 makes requests through the store controller 10 for the corresponding item records, and from these extracts the current store prices for the promoted product and other competitive products, as indicated in block 66. If the consumer purchased the promote product instead of a competitive product, the steps of price retrieval are slightly different. First, as indicated in block 68, the computer 22 retrieves the promoted product price from the item record file. Then, as shown in block 70, the computer 22 identifies one or (optionally) more of the competitive products from the coupon deal record corresponding to the purchased triggering product. Finally, as shown in block 66, the computer 22 retrieves the prices of the competitive prices from the item record file 20.

After the prices of the promoted and competitive products have been retrieved, as described in the preceding paragraph, a targeted incentive is generated, as indicated in block 72, which is further described with reference to FIGS. 5 and 6.

Figure 5:
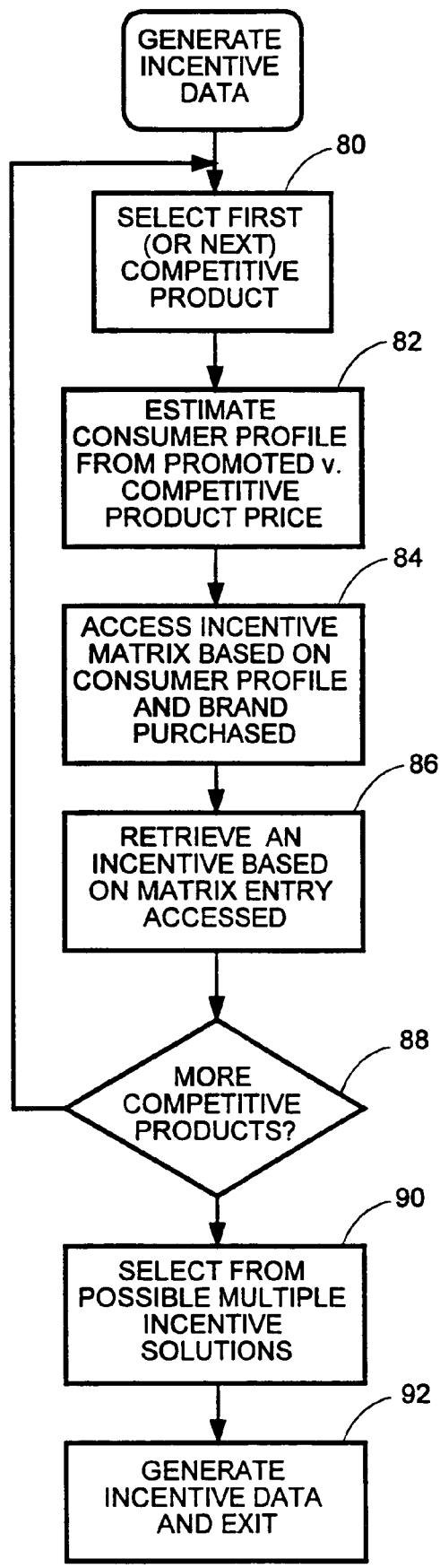
FIG. 5 is a flowchart showing the step of generation of incentive data of FIG. 4 in more detail.

As shown in FIG. 5, incentive data are generated using one competitive product at a time. For purposes of explanation, it is easier to consider that there is just one competitive product, but the same process may be performed in relation to multiple competitive products. The incentives generated will, in general, be different depending on which of the competitive products is purchased by the consumer. Handling multiple competitive products raises further strategy questions that have to be addressed in detailed design of the system. For example, if a consumer buys one competitive product, but there are multiple competitive products under consideration, to what degree should the prices of the other competitive products be considered in generating a targeted incentive to purchase the promoted product? The simplest solution is to ignore the other competitive products in this case and to treat each purchase transaction in isolation of the other competitive prices. A more detailed solution requires a more complex differential price matrix or more complex software logic to arrive at an appropriately targeted incentive. A related implementation issue is whether all competitive products should be taken into account when generating an incentive for a consumer who purchases the promoted product. In the genaralized flowchart of FIG. 5, it is assumed that the incentive generation logic will examine the prices of all competitive products. FIG. 5 is also applicable, however, to the case in which there is just one competitive product under consideration.

As shown in block 80, the first, next, or only competitive product is selected for consideration. Then, as shown in block 82, an estimated consumer profile is selected based on the promoted price versus the competitive price. An example is provided in the table of FIG. 6, which shows three categories of consumer profile. At one end of the profile spectrum, if the purchased brand has the lower price the consumer profile is "considered set," which is to say that because the consumer has purchased the lower priced brand, inducing a change may be very difficult. If the promoted and competitive brands are priced the same, the consumer's purchase of one of them is categorized as a "preference," the reason for which may be largely unknown. At the other end of the consumer profile spectrum, if the purchased brand is the higher priced one, the consumer profile is said to be "loyal." These are three broad categories. Given the two prices, of the promoted and competitive products, someone designing a promotion can infer a consumer profile ranging over a greater number of categories, each of which expresses a different degree of consumer brand loyalty, toward one end of the spectrum, or consumer "setness," toward the other end of the spectrum.

Estimating the consumer profile category, as indicated in block 82, involves a comparison of the prices of the promoted and competitive products. In the matrix of FIG. 6, there are only three consumer profile categories to choose from, based on the equality or inequality of the prices. In a more precise incentive matrix, additional categories may be established based on the degree of price inequality in each direction. The degree of price inequality may be measured in absolute terms (i.e., in terms of local currency), or may be measured in relative terms (i.e., in percentage difference). After estimating the consumer profile category, the computer 22 accesses the matrix, as indicated in block 84, in accordance with the estimated profile category, which determines the row of the matrix accessed in FIG. 6, and the brand purchased, which determines the column accessed. The computer 22 then retrieves an incentive stored in the matrix, as indicated in block 86.

If there are additional competitive products to consider, as determined in decision block 88, another competitive product is selected and the process is repeated starting at block 80 again. In the presently preferred embodiment of the invention, only one competitive product is considered in relation to the promoted product. In a more complex embodiment of the invention, the process of generating incentive data may arrive at multiple solutions, as, for example, when the consumer purchases the promoted product and the price has to be compared with multiple competitive prices. In this case, the computer 22 must select from among these multiple incentive solutions, as indicated in block 90. This step may simply select the incentive of the highest value to the consumer, for example, or an incentive average value, depending on the goals and objectives in marketing the promoted product. Once an incentive has been selected, the final step, shown in block 92, is to generate the remainder of the incentive data, such as for printing a coupon, and exit from this part of the program that generates the incentive data.

By way of example, the incentive matrix of FIG. 6 shows the incentive strategy for each entry in the three-by-two matrix. In the first row of the matrix, the consumer purchases the lower priced brand, which is "considered set." The strategy is defined as to "increase fair share" of the market for this product. This strategy must be translated into a specific incentive to be generated. For example, where the competing brand is purchased the price differential may be great enough that it is considered too costly to increase the market share of the promoted product by giving a large discount. A small discount may, therefore, be appropriate. Similarly, if the promoted brand is purchased, it may be considered an unnecessary expense to give any discount at all, since the consumer is already considered to be a "set" purchaser of the promoted product. The manufacturer of the promoted product may, of course, reach slightly different conclusions depending on the amount of the price differential. Basically, then, the matrix can be designed to meet any desired marketing goals or strategies. Moreover, it is easy to change the matrix and experiment to determine the effect of different strategies.

Where the prices are equal, the strategies are defined as to "expand consumption" if the promoted brand is purchased, or to "induce trial" of the promoted product if the competitive brand is purchased. Because there is no price differential at all, it may be considered worthwhile to offer a small discount to consolidate the consumer's preference for the promoted product, or to induce trial of the promoted product when the consumer's preference has been for the competitive product. Marketing considerations may be such that the discount offered to induce a trial may be greater than the discount offerred to consolidate the existing preference. Again, experimentation is a simple matter and different strategies may be tried without undue expense. Moreover, a strategy that works well for one product may be inappropriate for another, but the convenience with which the incentive matrix may be changed allows for many solutions to be tried over a period of time.

Finally, similar considerations apply to the "loyalty" profile cases. If the consumer buys the promoted product, even though of higher price than the competitive product, a small reward may be in order to consolidate the consumer's loyal preference. On the other hand, if the consumer exhibits loyalty to the competitive brand, a relatively large discount, at least as great as the price differential, may be required to induce the consumer to try the promoted brand. Depending on how vigorously the promoted brand is to be promoted, inducements to switch brands may take the form of a completely free offer, where the incentive is a coupon for a free sample of the promoted brand, but not necessarily of the same size as that purchased. The free sample may, in some cases, cost the manufacturer less than a price-equalizing discount on the size purchased by the consumer.

It will be apparent from the foregoing that the present invention represents a significant advance in the field of generation of sales inducements. More specifically, the invention provides a technique for generating purchasing incentives that are customized and targeted to consumers based on the brand actually purchased and on the relative prices of the promoted and competitive brands. The technique of the invention uses an incentive matrix with separate entries for different price differentials and different products actually purchased. The matrix provides a convenient form for storing the desired level of incentive to be applied for each consumer profile and produce selected for purchase. The matrix, therefore, customizes each incentive to a high degree before evidence of the incentive is generated and distributed to the consumer. The matrix also provides a convenient technique for quickly modifying the various levels of incentive to permit promotional programs to be adjusted without inconvenience. It will also be appreciated that, although the invention has been described in detail for purposes of illustration, various modifications may be made without departing from the spirit and scope of the invention. Accordingly, the invention should not be limited except as by the appended claims.

We claim:

1. A system, comprising:
    storage means for storing incentive data;
    means for selecting incentive data from said storage means depending upon (1) purchase of a first item, (2) a price of said first item, and (3) a price for a second item; and
    wherein said storage means (1) stores first incentive data defining a first incentive associated with a purchase of said first item and (2) stores second incentive data defining a second incentive for purchase of said first item, and said means for selecting selects said first incentive data or said second incentive data, depending upon said price of said first item and said price of second item.

2. A system according to claim 1 further comprising means for providing an incentive based upon the selected incentive data to a purchaser of the first item.

3. The system according to claim 1, further comprising a printer for printing an incentive based upon the selected incentive data.

4. The system according to claim 1, further comprising a printer at a point of sale for printing an incentive for a purchaser of the first item in response to the purchase of said first item and based upon the selected incentive data.

5. The system according to claim 1 wherein said means for selecting selects incentive data based upon a difference in price between said first item and said second item.

6. A system comprising:
    storage means for storing incentive data:
    means for selecting incentive data from said storage means depending upon (1) purchase of a first item. (2) a price of said first item, and (3) a price for a second item: and 7. A computer implemented method comprising the steps of:
    storing incentive data;
    selecting incentive data from the stored incentive data depending upon (1) purchase of a first item, (2) a price of said first item, and (3) a price for a second item; and
    wherein said step of storing (1) stores first incentive data defining a first incentive associated with a purchase of said first item and (2) stores second incentive data defining a second incentive for purchase of said first item, and said step of selecting selects said first incentive data or said second incentive data, depending upon said price of said first item and said price of said second item.

8. A method according to claim 7 further comprising the step of providing an incentive based upon the selected incentive data to a purchaser of said first item.

9. The method according to claim 7 further comprising the step of printing from a printer an incentive based upon the selected incentive data.

10. The method according to claim 7 further comprising the step of printing from a printer at a point of sale an incentive for a purchaser of said first item in response to the purchase of said first item and based upon the selected incentive data.

11. The method according to claim 7 wherein said step of selecting selects incentive data based upon a difference in price between said first item and said second item.

12. A computer implemented method comprising the steps of: storing incentive data:
    selecting incentive data from the stored incentive data depending upon (1) purchase of a first item, (2) a price of said first item, and (3) a price for a second item; and
    wherein said first item and said second item are competitive items.

* * * * *